US008094756B2

(12) United States Patent
Nieto

(10) Patent No.: US 8,094,756 B2
(45) Date of Patent: Jan. 10, 2012

(54) PORTABLE COMMUNICATIONS DEVICE WITH DEMODULATION CORRECTION AND RELATED METHODS

(75) Inventor: John W. Nieto, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 537 days.

(21) Appl. No.: 12/329,981

(22) Filed: Dec. 8, 2008

(65) Prior Publication Data

US 2010/0142631 A1  Jun. 10, 2010

(51) Int. Cl.
*H04L 27/06* (2006.01)
*H03H 7/30* (2006.01)
*H04J 1/00* (2006.01)

(52) U.S. Cl. ............... 375/340; 375/229; 370/208

(58) Field of Classification Search .......... 375/316, 375/340, 341, 343, 229; 370/203, 208
See application file for complete search history.

(56) References Cited

U.S. PATENT DOCUMENTS

| 2003/0128660 | A1* | 7/2003 | Ito et al. ............ 370/210 |
| 2004/0037311 | A1* | 2/2004 | Willes et al. ........ 370/465 |
| 2004/0085239 | A1* | 5/2004 | Ukena et al. ........ 342/81 |
| 2004/0156309 | A1* | 8/2004 | Chadha et al. ....... 370/208 |
| 2006/0274641 | A1  | 12/2006 | Grieco et al. ....... 370/210 |
| 2007/0230603 | A1* | 10/2007 | Sato ................ 375/260 |
| 2008/0039024 | A1  | 2/2008 | Ikeda et al. ........ 455/73 |
| 2008/0151985 | A1* | 6/2008 | Chin et al. .......... 375/231 |

OTHER PUBLICATIONS

Jun Lee, Broadband Technology "Principles of spread-spectrum communications",www.rfdesign.com, Aug. 2007.
John Nieto, "An Investigation of Constant-Envelope Variations of OFDM Waveforms for Use on HF Multipath Fading Channels", Mar. 2008.
Steve C. Thompson, University of California, San Diego, "Constant Envelope OFDM Phase Modulation", 2005, pp. 1-211.

* cited by examiner

*Primary Examiner* — David Payne
*Assistant Examiner* — Vineeta Panwalkar
(74) *Attorney, Agent, or Firm* — Allen, Dyer, Doppelt, Milbrath & Gilchrist, P.A.

(57) ABSTRACT

A portable communications device communicates based upon constant envelope orthogonal frequency-division multiplexing (CE-OFDM). The portable communications device may include an antenna for receiving a CE-OFDM signal, and a receiver coupled to the antenna. The receiver may include a frequency domain equalizer (FDE) operating based upon a channel estimate of the received CE-OFDM signal, a non-linear function block coupled to and downstream from the FDE, and a demodulation correction block coupled to and downstream from the non-linear function block for correcting an output of the non-linear function block.

20 Claims, 2 Drawing Sheets

PORTABLE COMMUNICATIONS DEVICE WITH DEMODULATION CORRECTION AND RELATED METHODS

FIELD OF THE INVENTION

The present invention relates to the field of communications, and, more particularly, to portable communications devices using constant envelope orthogonal frequency-division multiplexing waveforms and related methods.

BACKGROUND OF THE INVENTION

Mobile communications devices have become an integral part of society over the last two decades. Indeed, more than eighty-two percent of Americans own a mobile communications device, for example, a cell phone. The typical mobile communications device includes an antenna, and a transceiver coupled to the antenna. The transceiver and the antenna cooperate to transmit and receive communications signals.

The typical transceiver includes a power amplifier for amplifying low voltage signals for transmission via the antenna. Given that most mobile communications devices operate on limited battery power, energy efficient power amplifiers may be desirable. More specifically and as will be appreciated by those skilled in the art, Class C and E power amplifiers are common in mobile communications devices since they are efficient power amplifiers. These classes of power amplifiers are more efficient than Class A or B amplifiers, for example, but are subject to performance tradeoffs. For example, they may be non-linear over certain frequencies and may introduce greater amounts of distortion into the amplified signal (if the signal requires a linear amplifier).

In some mobile communications applications, it may be helpful to implement orthogonal frequency-division multiplexing (OFDM), which has a high spectral efficiency and robustness in multipath environments. Nonetheless, since OFDM signals have a high peak-to-average power ratio (PAPR), the use of non-linear and efficient Class C or E amplifiers may introduce unwanted distortion into the OFDM signal. Accordingly, the typical OFDM mobile communications device may include less efficient yet more linear amplifiers, thereby undesirably decreasing battery life.

An approach to compensating for this tradeoff is to encode transmitted signals with constant envelope (CE) or continuous phase modulation (CPM) waveforms. These modulations provide for lower energy demands on the power amplifier of the transceiver, for example, by reducing the PAPR, increasing average transmit power (providing greater transmission range), and increasing amplifier efficiency.

For example, U.S. Patent Application Publication No. 2008/0039024 to Ikeda et al. discloses an amplifying circuit. The amplifying circuit processes an input orthogonal frequency-division multiplexing (OFDM) signal and provides a pair of CE output signals to provide better power efficiency and less distortion. A particularly advantageous approach is constant envelope orthogonal frequency-division multiplexing (CE-OFDM).

The CE version of OFDM does not typically use pilot tones to provide channel estimation. Hence, the typical CE-OFDM mobile communications device may include a frequency domain equalizer (FDE). A potential drawback to the typical CE-OFDM mobile communications device is the undesired introduction of distortion into the received signal by the FDE and other components.

An approach to address this drawback is disclosed in U.S. Patent Application Publication No. 2006/0274641 to Grieco et al. This CE-OFDM device includes two-stage equalization of a received CE-OFDM signal. More specifically, the CE-OFDM device includes iterative demodulation between pre and post demodulation equalizers.

SUMMARY OF THE INVENTION

In view of the foregoing background, it is therefore an object of the present invention to provide a CE-OFDM portable communications device with robust signal processing and/or efficient power consumption.

This and other objects, features, and advantages in accordance with the present invention are provided by a portable communications device communicating based upon constant envelope orthogonal frequency-division multiplexing (CE-OFDM). The portable communications device may include an antenna for receiving a CE-OFDM signal, and a receiver coupled to the antenna. The receiver may comprise a frequency domain equalizer (FDE) operating based upon a channel estimate of the received CE-OFDM signal, at least one non-linear function block coupled to and downstream from the FDE, and a demodulation correction block coupled to and downstream from the non-linear function block for correcting an output thereof. Advantageously, the distortion introduced by the FDE into the CE-OFDM signal is corrected by the demodulation correction block.

More particularly, the receiver may further comprise a forward error correction (FEC) block coupled to and downstream from the demodulation correction block and cooperating therewith. The demodulation correction block may use/comprise plurality of look-up tables for corresponding values of non-linearity from the non-linear function block, for example.

Additionally, the channel estimate may be based upon a test chirp signal. Further, the demodulation correction block may correct non-linearity of the output of the non-linear function block by at least processing a test CE-OFDM frame, and weighting CE-OFDM tones based upon the processed test CE-OFDM frame. The test CE-OFDM frame may have symbols set to known amplitudes.

For example, the non-linear function block may comprise an arctangent function block. In some embodiments, the receiver may further comprise a matched filter block coupled between the non-linear function block and the demodulation correction block. The demodulation correction block may further correct for distortions from the matched filter block.

Another aspect is directed to a method of operating a portable communications device communicating based upon CE-OFDM and comprising a FDE, a demodulation correction block downstream from the FDE, and at least one non-linear function block therebetween. The method may include receiving a CE-OFDM signal, operating the FDE based upon a channel estimate of the received CE-OFDM signal, and using the demodulation correction block for correcting the output of the at least one non-linear function block.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
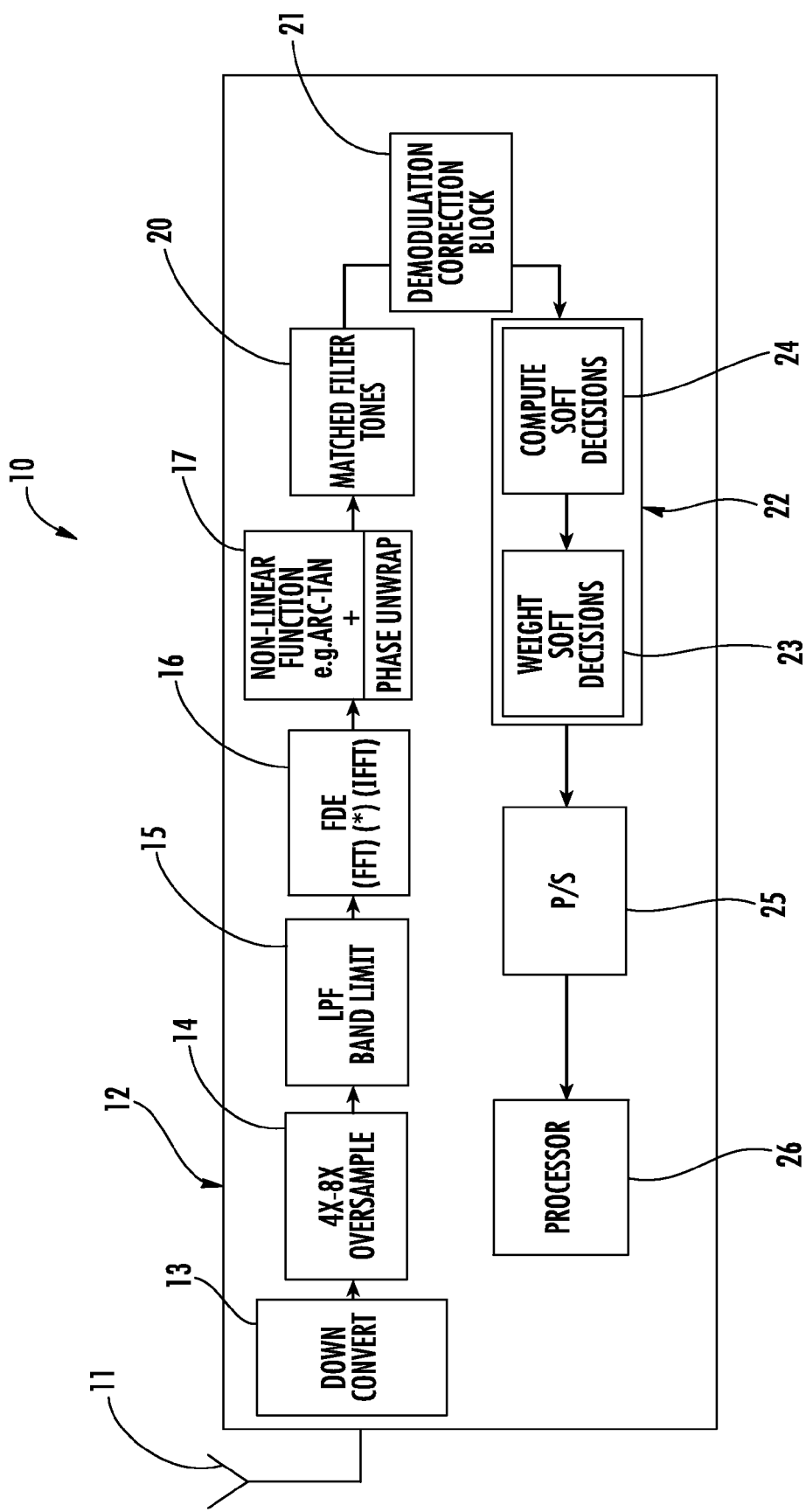
FIG. 1 is a schematic drawing of the portable communications device according to the present invention.

Referring initially to FIG. 1, a portable communications device 10 according to the present invention is now described. The portable communications device 10 communicates based upon constant envelope orthogonal frequency-division multiplexing (CE-OFDM). The portable communications device 10 illustratively includes an antenna 11 for receiving a CE-OFDM signal, and a receiver 12 coupled to the antenna.

The receiver 12 illustratively includes a downconverter block 13 downstream from the antenna 11, and a 4×-8× oversample block 14 downstream from the downconverter block. Furthermore, the receiver 12 also illustratively includes a low-pass filter block 15 downstream from the 4×-8× oversample block 14. The downconverter block 13 downconverts the received CE-OFDM signal from a radio frequency to a baseband signal. If the sampling rate out of the downconverter block 13 is not high enough, the oversample block 14 can be used to oversample the received CE-OFDM signal so that a phase demodulator (illustrated arctangent and phase unwrap block 17) provides good performance. The low-pass filter block 15 removes unwanted out-of-band noise from the received CE-OFDM signal prior to the arctangent and phase unwrap block 17. Since the receiver 12 system (prior to the arctangent and phase unwrap block 17) is linear, blocks 15 and 16 can be interchanged in order or combined into one block.

The receiver 12 illustratively includes a frequency domain equalizer 16 (FDE), for example, a linear equalizer, downstream from the low-pass filter block 15 for equalizing the received CE-OFDM signal based upon a channel estimate of the received CE-OFDM signal. As will be appreciated by those skilled in the art, the channel estimate provides data relating to noise and multipath effects, for example, in the CE-OFDM signal. The receiver 12 may provide the channel estimate by processing a test chirp signal, for example. As will be appreciated by those skilled in the art, the test chirp may include a cyclic prefix to improve the channel estimate.

Moreover, the receiver 12 illustratively includes a non-linear function block, for example, the illustrated arctangent and phase unwrap block 17, downstream from the FDE 16. In other embodiments, the receiver 12 may alternatively or additionally include other non-linear function blocks. Furthermore, the receiver 12 illustratively includes a matched filter tones block 20 downstream from the arctangent and phase unwrap block 17.

The receiver 12 illustratively includes a demodulation correction block 21 downstream from the arctangent and phase unwrap block 17 for correcting an output thereof. In other words, the demodulation correction block 21 corrects for non-linearity introduced into the CE-OFDM signal by the combination of the communication channel, noise, and the linear and the non-linear function block or blocks, i.e. the illustrated FDE 16 and arctangent and phase unwrap blocks 17. Moreover, the demodulation correction block 21 corrects for distortions introduced into the CE-OFDM signal by the communication channel, the FDE 16, and the noise, i.e. the demodulation correction block 21 provides a "second channel estimate" for the received CE-OFDM signal for determining what effects have been subjected to the signal during processing, such as the effects of the noise and the communication channel, i.e. multipath and fading, combined with the FDE 16 and the arctangent and phase unwrap block 17.

As will be appreciated by those skilled in the art, the typical CE-OFDM device has modulation tones spread over additional frequencies. The typical CE-OFDM device includes an FDE for equalization, which may be insufficient. Indeed, the CE-OFDM tones may see additional frequency selective fading after phase demodulation, even after FDE correction. Advantageously, the portable communications device 10 disclosed herein addresses these drawbacks of the typical CE-OFDM device.

More specifically and in certain embodiments, the demodulation correction block 21 corrects non-linearity of the output of the arctangent and phase unwrap block 17 by at least processing a test CE-OFDM frame, and weighting CE-OFDM tones based upon the processed test CE-OFDM frame. For example, when the CE-OFDM signal is subject to multipath fading and noise, an FDE (which is simply a linear equalizer) may not provide sufficient compensation for the multipath fading impairments, especially for multipath channels with deep spectral nulls. Thus, after the CE-OFDM signal has passed through the FDE 16 and arctangent and phase unwrap blocks 17, some residual distortion may still be present that can degrade performance of the matched filter tones block 20. By first sending a test chirp signal to estimate the FDE 16 parameters, i.e. channel estimate, and then a test CE-OFDM frame which uses the latest FOE parameters (as computed by test chirp signal or other signal used for channel estimation), the system can compute the additional correction required by each tone based upon the output of the matched filter tones block 20 relative to the expected output of the test CE-OFDM frame, thus improving system performance.

The test CE-OFDM frame has data symbols set to a threshold amplitude or known amplitudes. The test CE-OFDM frame is input into the receiver 12 and examined at the output of the matched filter block 20 to determine what distortion was introduced by the communication channel, the noise, the FDE, the arctangent and phase unwrap, and matched filter blocks 16, 17, 20. As will be appreciated by those skilled in the art, in certain embodiments, the phase unwrap portion of block 17 is undesirable, thus the phase unwrapping function is optional.

In other embodiments, the demodulation correction block 21 corrects non-linearity of the output of the arctangent and phase unwrap block 17 by using look-up tables for corresponding values of non-linearity from the FDE, the arctangent and phase unwrap, and the matched filter blocks 16, 17, 20. The look-up tables may be provided based upon an a priori observed non-linearity in the processed CE-OFDM signal as a function of certain characteristics in the channel estimate. By utilizing look-up tables instead of the test CE-OFDM frame, less overhead is introduced into the CE-OFDM waveform at the cost of pre-computed look-up tables based on expected channel conditions. The channel estimate resulting from the test chirp signal (or other channel estimation signal) and a noise estimate are used to select the appropriate look-up table. Note that an a priori software simulation of system with different multipath fading and noise conditions allows for the creation of look-up tables that correct for these effects after going through blocks 16, 17 and 20. Advantageously, these embodiments reduce overhead of the receiver 12 and increase performance.

In addition, the receiver 12 illustratively includes a forward error correction (FEC) block 22 downstream from the demodulation correction block 21 and cooperating therewith. As will be appreciated by those skilled in the art, the FEC block 22 illustratively includes a compute soft decisions block 24. Furthermore, the FEC block 22 illustratively includes a weight soft decisions block 23 downstream therefrom. The weight soft decisions block 23 operates based upon one or both the channel estimate and the corrections provided by the demodulation correction block 21. As will be appreciated by those skilled in the art, weighting bit soft decisions based on known or measured confidences of tone (or symbol) estimates can improve bit error rates.

Moreover, the receiver 12 illustratively includes a parallel to serial converter block 25 downstream from the FEC block 22. Downstream from the parallel to serial converter block 25, the receiver 12 further illustratively includes a processor 26 for further manipulation of the demodulated data of the received CE-OFDM signal.

Figure 2:
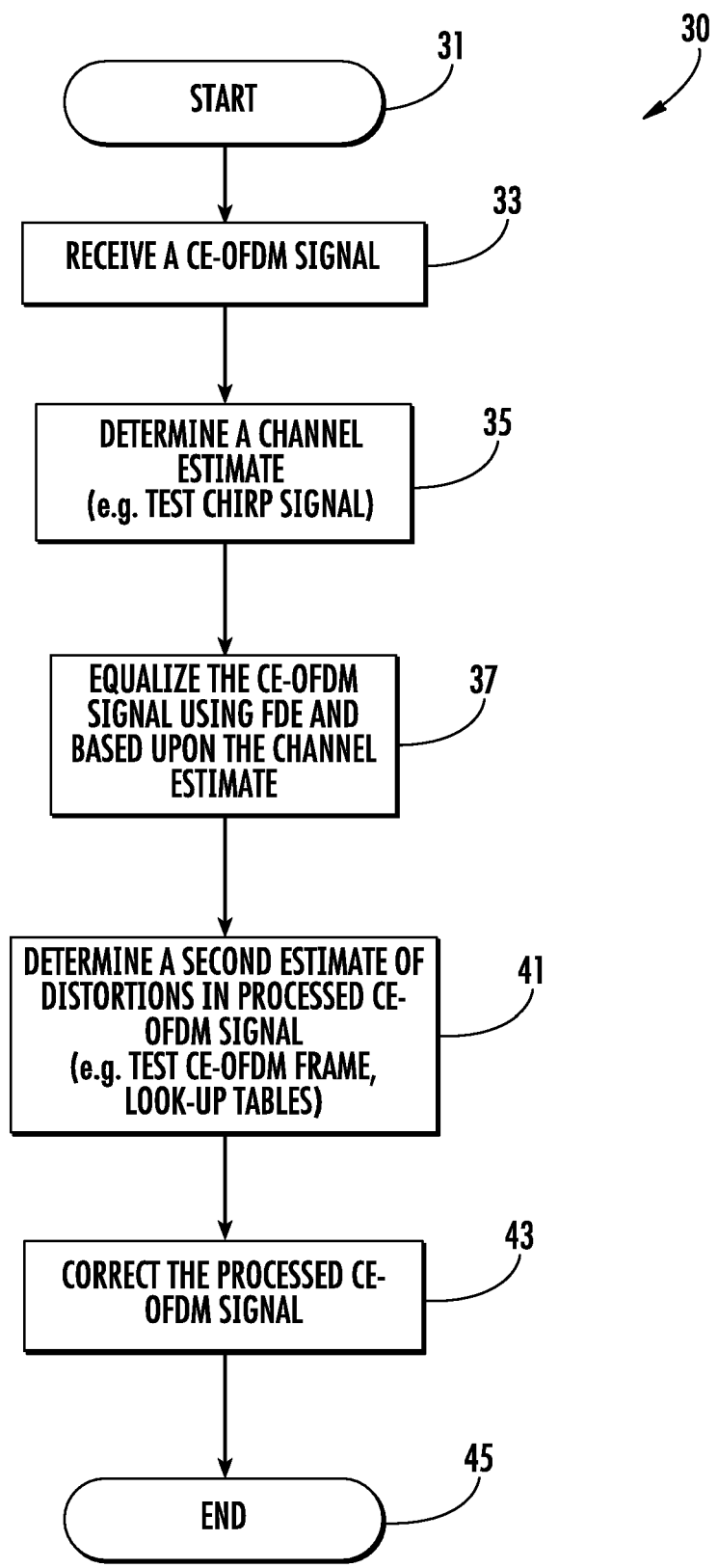
FIG. 2 is a flowchart illustrating a method of operating the portable communications device of FIG. 1.

Referring now additionally to FIG. 2, a flowchart 30 illustrates another aspect directed to a method of operating the portable communications device 10. The method begins at Block 31 and illustratively includes at Block 33 receiving a CE-OFDM signal. Once the CE-OFDM signal is received, the method moves to Block 35 for determination of the channel estimate to operate the FDE 16, for example, by processing the test chirp signal. At Block 37, the received CE-OFDM signal is equalized by the FDE 16 using the channel estimate. At Block 41, the processed CE-OFDM signal is examined to provide a second estimate of the distortion incurred due to the communication channel, the noise, the FOE, the arctangent and phase unwrap block, and the matched filter block 16, 17, 20. The method also illustratively includes at Block 43 using the demodulation correction block 21 for correcting the distortions in the processed CE-OFDM signal. The method ends at Block 45.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A portable communications device communicating based upon constant envelope orthogonal frequency-division multiplexing (CE-OFDM) and comprising:
   an antenna for receiving a CE-OFDM signal; and
   a receiver coupled to said antenna and comprising
      a frequency domain equalizer (FDE) operating based upon a channel estimate of the received CE-OFDM signal,
      at least one non-linear function block coupled to and downstream from said FDE, and
      a demodulation correction block coupled to and downstream from said at least one non-linear function block for correcting an output thereof.

2. The portable communications device according to claim 1 wherein said receiver further comprises a forward error correction (FEC) block coupled to and downstream from said demodulation correction block and cooperating therewith.

3. The portable communications device according to claim 1 wherein said demodulation correction block comprises a plurality of look-up tables for corresponding values of non-linearity from said at least one non-linear function block.

4. The portable communications device according to claim 1 wherein the channel estimate is based upon a test chirp signal.

5. The portable communications device according to claim 2 wherein said demodulation correction block and said FEC block correct non-linearity of the output of said at least one non-linear function block by at least:
   processing a test CE-OFDM frame; and
   weighting CE-OFDM tones based upon the processed test CE-OFDM frame.

6. The portable communications device according to claim 5 wherein the test CE-OFDM frame has symbols set to known amplitudes.

7. The portable communications device according to claim 1 wherein said at least one non-linear function block comprises an arctangent function block.

8. The portable communications device according to claim 1 wherein said receiver further comprises a matched filter block coupled between said at least one non-linear function block and said demodulation correction block; and wherein said demodulation correction block further corrects for distortions from said matched filter block.

9. A portable communications device communicating based upon constant envelope orthogonal frequency-division multiplexing (CE-OFDM) and comprising:
   an antenna for receiving a CE-OFDM signal; and
   a receiver coupled to said antenna and comprising
      a frequency domain equalizer (FDE) operating based upon a channel estimate of the received CE-OFDM signal from a test chirp signal,
      at least one non-linear function block downstream from said FDE, and
      a demodulation correction block being downstream from said at least one non-linear function block and using a test CE-OFDM frame to correct an output thereof.

10. The portable communications device according to claim 9 wherein said receiver further comprises a forward error correction (FEC) block downstream from said demodulation correction block and cooperating therewith.

11. The portable communications device according to claim 10 wherein said demodulation correction block and said FEC block correct non-linearity of the output of said at least one non-linear function block by at least:
   processing the test CE-OFDM frame; and
   weighting CE-OFDM tones based upon the processed test CE-OFDM frame.

12. The portable communications device according to claim 11 wherein the test CE-OFDM frame has symbols set to known amplitudes.

13. The portable communications device according to claim 9 wherein said at least one non-linear function block comprises an arctangent function block.

14. The portable communications device according to claim 9 wherein said receiver further comprises a matched filter block between said at least one non-linear function block and said demodulation correction block; and wherein said demodulation correction block further corrects for distortions from said matched filter block.

15. A method of operating a portable communications device communicating based upon constant envelope orthogonal frequency-division multiplexing (CE-OFDM) and comprising a frequency domain equalizer (FDE), a demodulation correction block downstream from the FDE, and at least one non-linear function block therebetween, the method comprising:
   receiving a CE-OFDM signal;
   operating the FDE based upon a channel estimate of the received CE-OFDM signal; and
   using the demodulation correction block for correcting the output of the at least one non-linear function block.

16. The method according to claim 15 further comprising performing forward error correction (FEC) downstream from the demodulation correction block and cooperating therewith.

17. The method according to claim 15 wherein the demodulation correction block uses a plurality of look-up tables for corresponding values of non-linearity from the at least one non-linear function block.

18. The method according to claim 15 wherein the channel estimate is based upon a test chirp signal.

19. The method according to claim 15 wherein correcting the output of the FDE comprises:
   processing a test CE-OFDM frame; and
   weighting CE-OFDM tones based upon the processed test CE-OFDM frame.

20. The method according to claim 19 wherein the test CE-OFDM frame has symbols set to known amplitudes.

* * * * *